F. ROHWER.
SAUSAGE FILLING MACHINE.
APPLICATION FILED JAN. 28, 1914.

1,164,400.

Patented Dec. 14, 1915.

Witnesses:
Pearl Putnam.
K. E. Barkley.

Inventor
Franz Rohwer,
by Franks Annerman,
atty

UNITED STATES PATENT OFFICE.

FRANZ ROHWER, OF NEUMÜNSTER, GERMANY.

SAUSAGE-FILLING MACHINE.

1,164,400.

Specification of Letters Patent.

Patented Dec. 14, 1915.

Application filed January 23, 1914. Serial No. 814,977.

*To all whom it may concern:*

Be it known that I, FRANZ ROHWER, a subject of the King of Prussia, residing at Neumünster, in the Province of Schleswig-Holstein and Kingdom of Prussia, Germany, have invented certain new and useful Improvements in Sausage-Filling Machines, of which the following is a specification.

This invention relates to sausage filling machines, and consists chiefly of an improvement in the arrangement and shape of the cut-off valve controlling the inlet and outlet of the filling cylinder whereby the pressure which acts upon the sausage meat in the supply cylinder actuates also the said cut-off valve.

Figure 1:
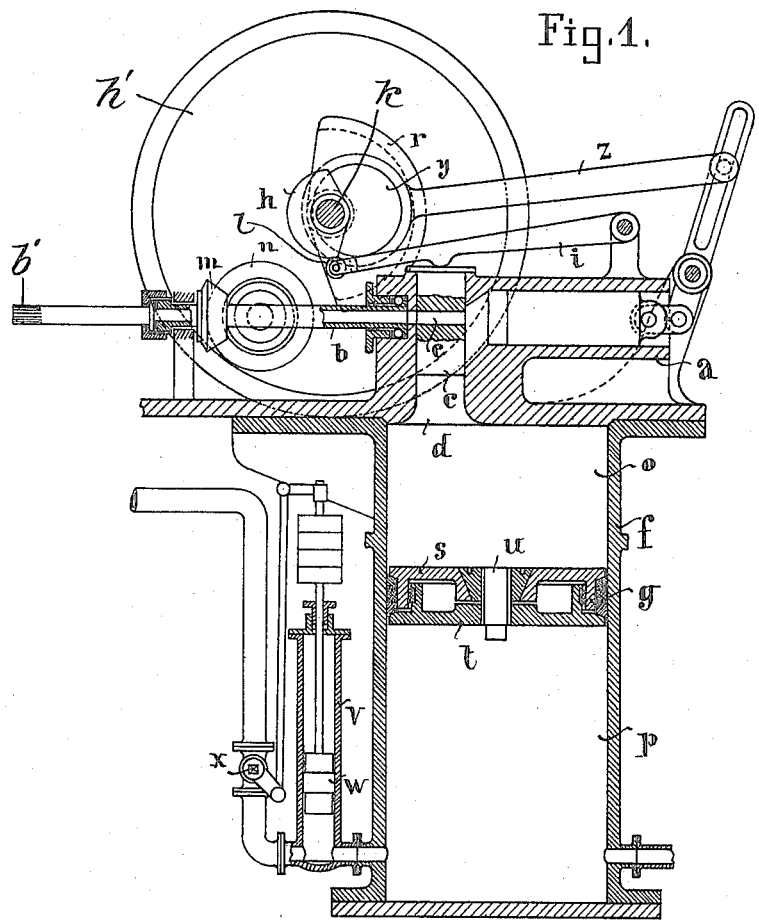
Figure 2:
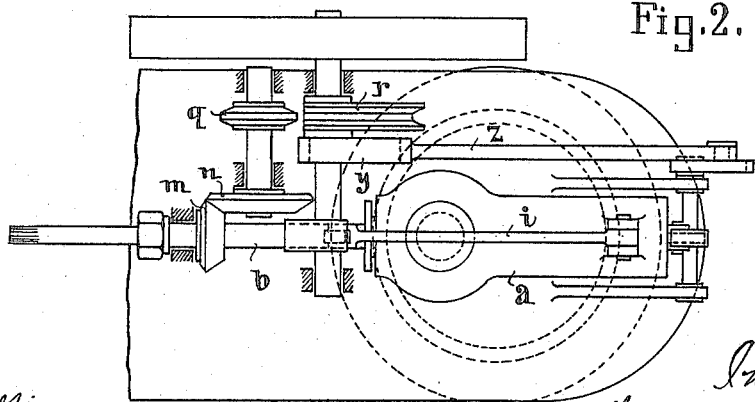

An example of the invention is shown in Figures 1 and 2, in which Fig. 1 is a side elevation partly in section, and Fig. 2 a plan view.

The supply cylinder charged with sausage-meat carries on its upper end a plate, upon which is mounted the filling cylinder $a$ and the working gear. The supply cylinder $f$ is divided by a plunger $g$ the upper space $o$ containing the meat and the lower $p$ containing water which is maintained under pressure by a special device hereinafter described. The space $o$ communicates with the filling cylinder $a$ by means of the passage $d$ into which opens the delivery tube $b$. The passage $d$ and tube $b$ are arranged so near together against the filling cylinder $a$ that they can be controlled simultaneously by one and the same cut-off valve.

In the arrangement shown the cut-off device consists of a vertically moving piston valve $c$ which works in the passage $d$ so as to close it with its lower end. The filling cylinder communicates with the delivery tube through a cross passage $e$ in the piston valve. The downward movement of the piston valve is effected by a hinged arm $i$ pressing upon it under the action of a cam $h$ mounted on the main shaft $k$, the arm having a roller $l$ at its free end. The valve rises when the cam $h$ permits through the pressure of the sausage meat from below.

The delivery tube $b$ is made rotatable on its axis by means of a pair of bevel wheels $m$, $n$, which are themselves driven by a pair of friction wheels $q$, $r$. As the rotation of the tube must be suspended during the passing of the sausage meat, a certain portion of the circumference of one $r$ of the friction wheels is interrupted. The extremity $b'$ of the tube itself is fluted so as to carry the sausage skin with it in its rotation.

The plunger $g$, dividing the meat space from the water, consists of an upper plate $s$ and a lower one $t$, between which a packing ring, (or two by means of an intermediate plate) may be introduced. These packing rings are preferably made of fatty material and the edges of the plates beveled toward one another so that when forced nearer together by means of a screw $u$ the fatty material is squeezed outward and the tightness of the plunger insured. Should the plates work loose upon the screw the packing will nevertheless remain effective automatically owing to the opposing pressures of the water and the sausage-meat upon the faces of the plates.

The pressure of the water is controlled by a regulator connected with the supply cylinder, consisting of a cylinder $v$ in which a weighted plunger $w$ moves. The stem of this plunger is connected with the pressure water supply cock $x$ in such a manner that the latter is opened automatically by the weighted plunger.

The operation of the machine is as follows:—The filling plunger is actuated by an eccentric $y$ mounted on the main shaft $k$ through a rod $z$ adjustably connected therewith, and upon the back stroke of the plunger, the valve $c$ being raised, the sausage meat, (which has been kept under constant pressure in the space $o$ by means of the pressure regulator already described) passes through the passage $d$ and enters the cylinder $a$ without any empty space or air having entered into the latter. The cams $h$, $y$ and $r$ which are herein clearly described, are mounted on the shaft $k$ and consequently move therewith, said shaft being moved by the belt wheel $h'$ which is connected to a suitable power element, not shown. When the filling plunger reaches the end of its stroke, the valve $c$ is acted on by the cam $h$ and arm $i$, worked from the shaft $k$, and uncovers the delivery tube $b$, whereupon the filling plunger travels forward and forces the sausage meat into the skin. At the end of this forward stroke the hub $h$ and arm $i$ set the valve $c$ free and the superior pressure of the sausage-meat lifts this valve, thus re-opening the passage between $d$ and the cylinder $a$ and closing the delivery tube $b$, so that no sausage-meat or air can be sucked back therethrough.

The delivery tube is set in rotation during the back stroke of the filling plunger, by means of the gearing already described, in order to twist the sausage-skin, the valve *c* meanwhile being stationary.

I claim:

1. A sausage filling machine, comprising a supply cylinder, a filling cylinder above the supply cylinder, said filling cylinder having a vertically disposed passage-way, a reciprocating valve operating in the passage-way, a tube on one end of the filling cylinder, said valve having an opening adapted to aline with the tube and the filling cylinder, said valve adapted to lie normally in a plane above the filling cylinder, said valve adapted to be moved upwardly by pressure of the meat being forced into the filling cylinder, means for moving the valve downwardly whereby the opening therein registers with the filling cylinder and tube, and means for forcing material into the filling cylinder.

2. A sausage filling machine comprising a supply cylinder, a filling cylinder above the supply cylinder, said filling cylinder having a passage-way therein, a revolving tube secured to the filling cylinder, a vertically movable valve in the passage-way, said valve having an opening adapted to aline with the tube and filling cylinder, means in the supply cylinder for forcing material into the filling cylinder, whereby the material moves the valve vertically, a cam engaging the valve for moving the vale to its normal position, and means in the filling cylinder for forcing material therefrom.

3. A sausage filling machine comprising a supply cylinder and a filling cylinder above the supply cylinder, means for forcing material from the supply cylinder into the filling cylinder, a reciprocating valve adjacent the filling cylinder for controlling the discharge of material from the filling cylinder, said valve adapted to be moved vertically by the passage of material from the supply cylinder, an arm having one of its ends pivotally connected to the filling cylinder, said arm having an enlargement engaging the valve for returning the valve to its normal position.

In testimony whereof I affix my signature in presence of two witnesses.

FRANZ ROHWER.

Witnesses:
ERNEST H. L. MUMMENHOFF,
IDA CHRIST HAFERMANN.

Copies of this patent may be obtained for five cents each, by addressing the "Commissioner of Patents, Washington, D. C."